Patented Apr. 22, 1924.

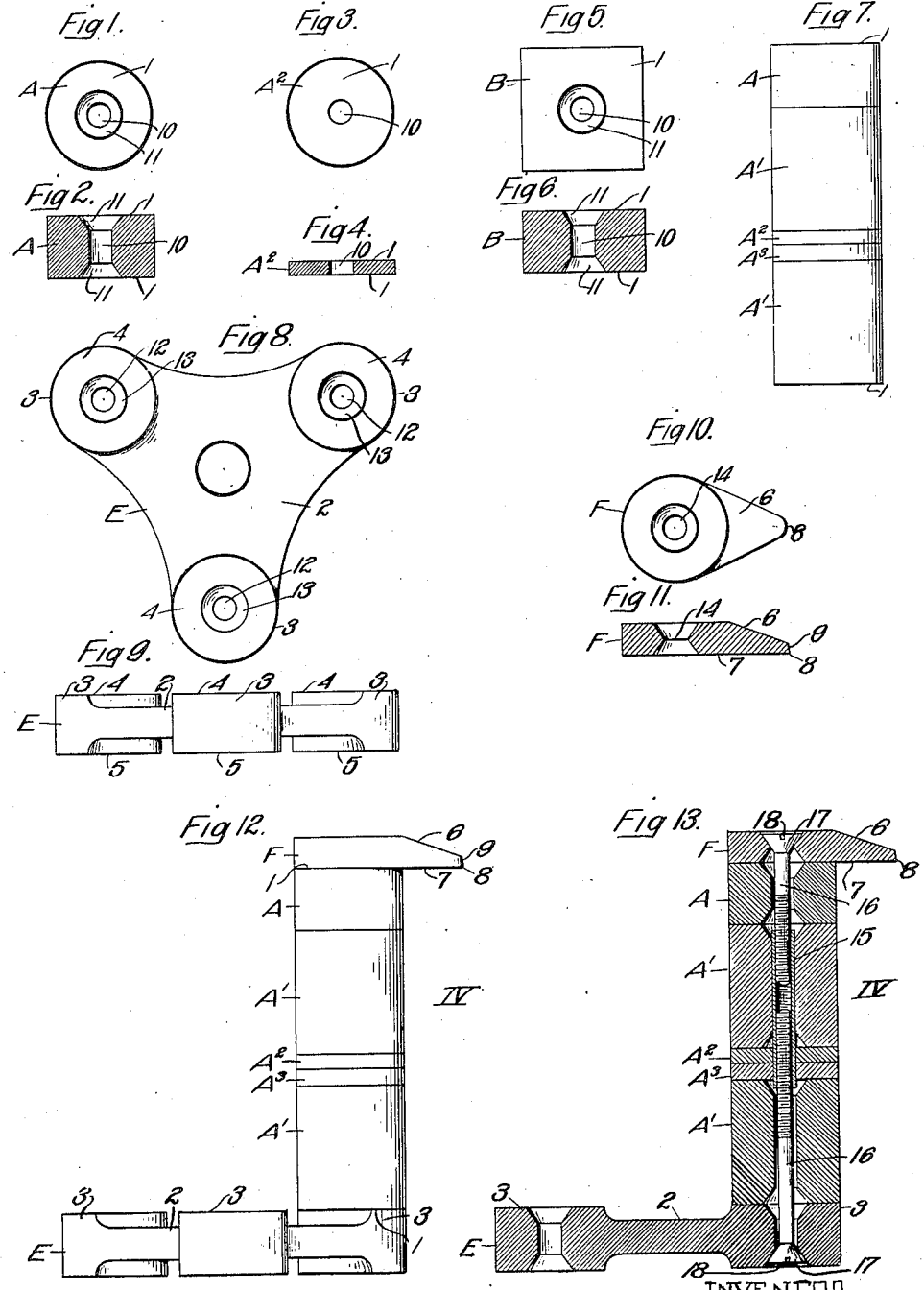

1,491,099

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

PRECISION GAUGE AND SCRIBER.

Application filed April 9, 1919. Serial No. 288,789.

*To all whom it may concern:*

Be it known that I, WILLIAM E. HOKE, a citizen of the United States, residing at St. Louis, Missouri, have invented certain new and useful Improvements in Precision Gauges and Scribers, of which the following is a specification.

The object of the invention is to provide an improved gauge device which includes a scriber and preferably a base plate, and which is adapted for scribing a line at a predetermined distance from a flat surface. The gauge includes one or more gauge blocks of predetermined lengths.

In the accompanying drawing I have illustrated a gauge and scriber embodying the invention but it will be understood that the drawing is intended for illustrative purposes only and is not to be construed as defining or limiting the scope of the invention, the accompanying claims being relied upon for that purpose.

Of the drawing:

Figs. 1 and 2, 3 and 4, and 5 and 6 are end and longitudinal sectional views respectively of different gauge blocks adapted to be used in accordance with the invention.

Fig. 7 is a side view of a series of gauge blocks.

Figs. 8 and 9 are plan and side views respectively of a combined base plate and supplemental gauge element.

Figs. 10 and 11 are end and side views respectively of a supplemental gauge element in the form of a scriber.

Fig. 12 is a side view of a gauge including the base plate shown in Figs. 8 and 9 and the scriber shown in Figs. 10 and 11.

Fig. 13 is a sectional view of the gauge shown in Fig. 12.

A gauge embodying the invention preferably consists in part of one or more gauge blocks such as are set forth in my copending application for precision gauges, Serial No. 288,787, filed on even date herewith. In Figs. 1 and 2 I have shown a gauge block A constructed in accordance with the invention. In Figs. 3 and 4 I have shown a block $A^2$ which is similar but much shorter. The blocks A and $A^2$ are circular and this shape is preferred for many purposes. However blocks with other shapes may be provided and in Figs. 5 and 6 I have shown a square block B.

Each block has opposite parallel plane or flat end faces 1, 1 which are at a predetermined distance apart. By means of my improved method and machine, as set forth in my copending application for method of and machine for making gauges and other articles, Serial No. 289,591 filed April 12, 1919, each block may be made without any error greater than one one-millionth of an inch in the flatness of the end faces or in the length between them. Ordinarily the blocks are furnished in sets with assorted lengths, the transverse size and shape of all of the blocks of the set preferably being the same. The lengths of the blocks are either multiples or definite fractions, usually decimal fractions, of a predetermined unit of length. This unit may be the inch, or the centimeter or any other convenient unit of length. If the inch is the unit decided upon, the lengths of the blocks are ordinarily multiples of a thousandth of an inch or multiples of a ten-thousandth of an inch. For a given set of blocks with lengths in multiples of thousandths the lengths may be so selected as to make it possible, by combining different blocks in wringing contacts end to end, to form a series having any desired length measured in inches and thousandths; and, by adding to the set other blocks having lengths in multiples of ten-thousandths it is possible, by combining the blocks, to form a series having any desired length measured in inches and ten-thousandths. Such a series of blocks is illustrated in Fig. 7. The total length of the series is obviously the sum of the total lengths of the individual blocks A, $A^1$, $A^2$, $A^3$ and $A^1$. By properly selecting the several blocks any desired total length can be secured.

It is frequently desired to provide a gauge block or base plate which is larger than that provided by the end of one of the regular blocks. Figs. 8 and 9 show a base plate E such as may be used, but I do not limit myself as concerns the details of construction of this base plate. As illustrated, the base plate E comprises a central web 2 and three equally spaced bosses 3 preferably of the same diameter as the regular blocks. The three bosses are provided at one end with flat faces, 4 all in the same plane, and at the other end with parallel flat faces 5 all in the same plane. The length of the bosses between the faces 4 and 5 is definite and predetermined, as for instance one-half of the predetermined unit.

It will be seen that a gauge can be constructed by positioning a series of regular blocks on any one of the bosses 3. Inasmuch as the distance between the faces of the base plate is known, the base plate constitutes one of the elements of the gauge in which it is included.

, It is frequently necessary to make a mark on a piece of work at a given distance above a flat surface, which may be a surface plate. For this purpose I provide a special gauge block or element in the form of a scriber F, as shown in Figs. 10 and 11. This is provided with a body part, which is preferably of the same diameter as the regular blocks, and with a scribing finger 6. The scriber has a flat face 7 and a scribing point 8 located in the plane of this face. The scriber is adapted to be placed at the end of a series of blocks with the face 7 engaging the face 1 of the end block. Preferably, as shown, the scriber has a round nose and a front face 9 which is nearly perpendicular to the face 7. This construction enables the scriber to effect a burnishing rather than a cutting of the surface to be marked. In practice, the scriber is pressed against the surface, effecting a burnishing thereof along a relatively broad band. The lower edge of this band constitutes the mark to be used in subsequent operations.

Figs. 12 and 13 show a scribing gauge IV which includes a base plate E and a scriber F combined with a series of regular blocks. This is a desirable combination, but it will be understood that neither the base plate nor the scriber is limited to use in combination with the other.

It is well known that several gauge blocks of the type herein shown will adhere to each other, or to other objects having flat faces, with considerable force when properly wrung into contact. It is therefore possible, and in many cases preferable, to combine the blocks and other elements and to use them without any special mechanical means for holding them together. I prefer, however, to make it possible to connect the several parts mechanically so that reliance need not be placed solely upon the force resulting from wringing contact. Each element is therefore provided with an abutment preferably located between the opposite faces or surfaces thereof, or at least between the confines of the said faces or surfaces. The abutment is adapted to be engaged by a suitable connecting means which extends from one element to another. The said connecting means is so constructed and arranged that it holds the several blocks together but nevertheless leaves unobstructed the outer gaging face or faces at the ends of the series of blocks or at least leaves unobstructed the major portion of the said gaging faces so that they can contact directly with the parts to be gaged. With the elements thus mechanically connected a strong and rigid gauge is secured which can be handled in the same way as an integral gauge.

Preferably each block or element is provided with an opening to receive the connecting means, and, as illustrated, the opening in each block is a central hole extending entirely through the element. When the block has its end faces flat and parallel the hole extends perpendicularly to the said parallel faces. As a connecting means I preferably provide a suitable tie-rod adapted to extend through the holes in the several elements. Preferably the opening or hole in each block or element is utilized to form the abutment which is engaged by the connecting means, this abutment being located, as aforesaid, between the opposite faces. When the opening is a central through hole 10, as illustrated in the drawings, the abutment is formed by countersinking the hole at least at one end as indicated at 11. Preferably the hole is countersunk at both ends to provide opposed abutments, but this is not essential. The countersinks may be omitted in the case of short blocks such as $A^2$. The special block or plate E has one or more holes therein which are similar to the holes 10 in the regular blocks and which are located near one edge thereof. As illustrated, each boss 3 of the base plate E is provided with a central hole 12 of the same diameter as the holes 10 and similarly countersunk, as indicated at 13. A hole 14 is provided in the body part of the scriber, this hole preferably being countersunk, as indicated.

The tie-rod may be varied as to details, but the construction illustrated in Fig. 13 has been found convenient. This consists of a central threaded tube 15 adapted to enter the holes, and two screws 16, 16 entering the tube. Preferably, in order that there may be no projections beyond the end faces of the outermost elements, the screws 16, 16° are formed with heads 17, 17 adapted to enter the countersinks in the outermost ends of the outermost elements and to lie below and leave unobstructed the corresponding outermost faces thereof. Ordinarily a number of screws with different lengths are provided so as to accommodate different combinations of blocks. It will be seen that by turning the screws the tie-rod as a whole can be shortened to draw and hold the blocks together. The heads 17, 17 are preferably provided with slots 18, 18 to permit the use of a screw driver.

It will be seen that when the several elements are arranged and connected as shown there is provided a convenient scribing gauge which can be used in the same manner as an integral gauge. The height of the gauge can have any predetermined value by properly selecting the several blocks A, A¹, A², A³, A⁴, etc.

What I claim is:

1. A relatively large base plate for a gauge provided with opposite parallel gaging faces at a predetermined precise distance apart, the said faces being flat so that the base plate may have at either side face to face wringing or surface contact with a smaller gauge block having a similar flat face, the said base plate being also provided with an opening therein near one edge thereof the walls of which form an abutment located between the opposite faces of the plate, whereby the plate may be connected in face to face contact with a smaller gauge block such as that aforesaid by suitable connecting means extending into the opening and engaging the abutment and positioned to leave unobstructed the gaging face of the plate opposite the face engaged by the block.

2. A relatively large base plate for a gauge provided with opposite parallel gaging faces at a predetermined precise distance apart, the said faces being flat so that the base plate may have at either side face to face wringing or surface contact with a smaller gauge block having a similar flat face, the said base plate being also provided with a through hole therein near one edge thereof extending from one face to the other and countersunk to form an abutment located between the said faces, whereby the plate may be connected in face to face contact with a smaller gauge block such as that aforesaid by a tie rod extending through the hole and having a head engaging the countersunk abutment and positioned to leave unobstructed the gaging face of the plate opposite the face engaged by the block.

3. A relatively large base plate for a gauge provided with opposite parallel gaging faces at a predetermined precise distance apart, the said faces being flat so that the base plate may have at either side face to face wringing or surface contact with a smaller gauge block having a similar flat face, the said base plate being also provided at a plurality of separated places with openings therein near the edge thereof the walls of which form abutments located between the opposite faces of the plate, whereby the plate may be connected in face to face contact at any one of the said places with a smaller gauge block such as that aforesaid by suitable connecting means extending into the corresponding opening and engaging the abutment and positioned to leave unobstructed the gaging face of the plate opposite the face engaged by the block.

4. A relatively large base plate for a gauge consisting of three equally spaced bosses with a connecting web between and provided with opposite parallel gaging faces at a predetermined precise distance apart, the said faces being flat so that the base plate may have at either side of any of the said bosses face to face wringing or surface contact with a smaller gauge block having a similar flat face, the said base plate being also provided with a through hole therein at the center of each boss extending from one face to the other and countersunk to form an abutment located between the said faces, whereby the plate may be connected in face to face contact at any one of the said bosses with a gauge block such as that aforesaid by a tie rod extending through the corresponding hole and having a head engaging the countersunk abutment and positioned to leave unobstructed the gaging face of the plate opposite the face engaged by the block.

5. A gauge comprising in combination a relatively large base plate provided with opposite parallel flat gaging faces at a predetermined precise distance apart and also provided with an opening therein near one edge thereof, one or more gauge blocks smaller that the base plate and each provided with similar opposite parallel flat faces at a predetermined distance apart, and each also provided with an opening therein, the said base plate and blocks respectively having face to face wringing or surface contact with each other, and connecting means extending into the openings in the plate and blocks and serving to connect them together with their respectively adjacent flat faces in contact as aforesaid.

6. A gauge comprising in combination a relatively large base plate consisting of three equally spaced bosses with a connecting web between and provided with opposite parallel flat gaging faces at a predetermined precise distance apart, the said base plate being provided with a through hole therein at the center of each boss extending from one face to the other, one or more gauge blocks smaller than the base plate and connected with one of the bosses of the base plate and each provided with similar flat faces, at least one of the blocks having opposite parallel flat faces at a predetermined distance apart and each block also being provided with a through hole therein extending from one surface to the other, the said base plate and blocks respectively having face to face wringing or surface contact with each other, and a tie rod extending through the holes in the plate and blocks and serving to connect them together with their respectively adjacent flat faces in contact as aforesaid.

7. A gauge comprising in combination a relatively large base plate provided with opposite parallel flat gaging faces at a predetermined precise distance apart and also provided with an opening therein near one edge thereof the walls of which form an abutment located between the opposite faces of the plate, one or more gauge blocks smaller than the base plate and provided respectively with similar flat faces, at least one of the blocks having opposite parallel flat faces at a predetermined distance apart and each block also being provided with an opening therein forming an abutment located between the opposite surfaces of the block, the said base plate and blocks respectively having face to face wringing or surface engagement with each other, and connecting means extending into the openings in the plate and blocks and engaging the abutments of the plate and of the outer block, the said connecting means being positioned to leave unobstructed the outer surfaces of the said plate and outer block.

8. A gauge comprising in combination a relatively large base plate provided with opposite parallel flat gaging faces at a predetermined precise distance apart and also provided with a through hole therein near one edge thereof extending from one face to the other and countersunk to form an abutment located between the said faces, one or more gauge blocks smaller than the base plate and provided respectively with similar flat faces, at least one of the blocks having opposite parallel flat faces at a predetermined distance apart and each block also being provided with a through hole therein extending from one surface to the other and countersunk to form an abutment located between the said surfaces, the said base plate and blocks respectively having face to face wringing or surface contact with each other and a tie rod extending through the holes in the plate and blocks and having heads engaging the countersunk abutments of the plate and outer block and positioned to leave unobstructed the outer surfaces of the said plate and outer block.

9. A scriber for a gauge having a flat face so that the scriber may have face to face wringing or surface contact with a gauge block having a similar flat surface, the said scriber having a scribing point in the plane of the said flat face and also having an opening therein the walls of which form an abutment whereby the scriber may be connected in face to face contact with a gauge block such as that aforesaid by suitable connecting means extending into the opening and engaging the abutment.

10. A scriber for a gauge having a flat face so that the scriber may have face to face wringing or surface contact with a gauge block having a similar flat surface, the said scriber having a scribing point in the plane of the said flat face and also having a through hole therein extending perpendicularly to the said face and countersunk to form an abutment whereby the scriber may be connected in face to face contact with a gauge block such as that aforesaid by suitable connecting means extending into the opening and engaging the abutment.

11. A scriber for a gauge having a flat face so that the scriber may have face to face wringing or surface contact with a gauge block having a similar flat surface, the said scriber having a scribing point in the plane of the said flat face, the nose of the scriber being rounded and the front face being nearly perpendicular to the said flat face whereby a burnishing rather than a cutting action is obtained.

12. A scriber for a gauge having a flat face so that the scriber may have face to face wringing or surface contact with a gauge block having a similar flat surface, the said scriber having a scribing point in the plane of the said flat face, the nose of the scriber being rounded and the front face being nearly perpendicular to the said flat face whereby a burnishing rather than a cutting action is obtained, and the said scriber also having an opening therein the walls of which form an abutment whereby the scriber may be connected in face to face contact with a gauge block such as that aforesaid by suitable connecting means extending into the opening and engaging the abutment.

13. A gauge comprising in combination a scriber having a flat face and having a scribing point in the plane of the said flat face, the said scriber also having an opening therein, one or more gauge blocks each provided with opposite parallel flat faces at a predetermined precise distance apart and each also provided with an opening therein, the said scriber and blocks respectively having face to face wringing or surface contact with each other, and connecting means extending into the openings in the scriber and blocks and serving to connect them together with their respectively adjacent flat faces in contact as aforesaid.

14. A gauge comprising in combination a scriber having a flat face and having a scribing point in the plane of the said flat face, the nose of the scriber being rounded and the front face being nearly perpendicular to the said flat face whereby a burnishing rather than a cutting action is obtained, the said scriber also having an opening therein, one or more gauge blocks each provided with opposite parallel flat faces at a predetermined precise distance apart and each also provided with an opening therein, the said scriber and blocks respectively having face to face wringing or surface contact with each other, and connecting means extending into the openings in the scriber and blocks and serving to connect them together with their respectively adjacent flat faces in contact as aforesaid.

15. A gauge comprising in combination a scriber having a flat face and having a scribing point in the plane of the said flat face, the said scriber also having a through hole therein extending perpendicularly to the said face, one or more gauge blocks each provided with opposite parallel flat faces at a predetermined precise distance apart and each also provided with a through hole therein extending from one face to the other, the said scriber and blocks respectively having face to face wringing or surface contact with each other, and connecting means extending into the holes in the scriber and blocks and serving to connect them together with their respectively adjacent flat faces in contact as aforesaid.

16. A gauge comprising in combination a scriber having a flat face and having a scribing point in the plane of the said flat face, the said scriber also being provided with an abutment, one or more gauge blocks each provided with opposite parallel flat faces at a predetermined precise distance apart and each also provided with an abutment located between the confines of the opposite faces thereof, the said scriber and blocks respectively having face to face wringing or surface contact with each other, and connecting means engaging the abutments of the scriber and blocks and serving to connect them together with their respectively adjacent flat faces in contact as aforesaid and positioned to leave unobstructed the outer gaging face of the block at the opposite end of the gauge from the scriber.

17. A gauge comprising in combination a scriber having a flat face and having a scribing point in the plane of the said flat face, the said scriber also being provided with a through hole therein countersunk to form an abutment located between the opposite surfaces thereof, one or more gauge blocks each provided with opposite parallel flat faces at a predetermined precise distance apart and each also provided with a through hole therein extending from one face to the other and countersunk to form an abutment located between the said opposite faces, the said scriber and blocks respectively having face to face wringing or surface contact with each other, and a tie rod extending through the holes and having heads engaging the abutments of the scriber and blocks and serving to connect them together with their respectively adjacent flat faces in contact as aforesaid and positioned to leave unobstructed the outer gauging face of the block at the opposite end of the gauge from the scriber.

18. A gauge comprising in combination a relatively large base plate provided with opposite parallel flat gauging faces at a predetermined precise distance apart, one or more gauge blocks smaller than the base plate and each provided with opposite parallel flat faces at a predetermined precise distance apart, and a scriber having a flat face and having a scribing point in the plane of the said flat face, the said base plate, blocks and scriber respectively having face to face wringing or surface contact with each other.

19. A gauge comprising in combination a relatively large base plate provided with opposite parallel flat gaging faces at a predetermined precise distance apart and also provided with an opening therein near one edge thereof, one or more gauge blocks smaller than the base plate and each provided with similar opposite parallel flat faces at a predetermined precise distance apart and each also provided with an opening therein, a scriber having a flat face and having a scribing point in the plane of the said flat face, the said scriber also having an opening therein, the said base plate, blocks and scriber respectively having face to face wringing or surface contact with each other, and connecting means extending into the openings in the plate, blocks and scriber and serving to connect them together with their respectively adjacent flat faces in contact as aforesaid.

20. A gauge comprising in combination a relatively large base plate provided with opposite parallel flat gaging faces at a predetermined precise distance apart and also provided with a through hole therein near one edge thereof extending from one face to the other, one or more gauge blocks smaller than the base plate and each provided with similar opposite parallel flat faces at a predetermined precise distance apart and each also provided with a through hole therein extending from one face to the other, a scriber having a flat face and having a scribing point in the plane of the said flat face, the said scriber also having a through hole therein extending perpendicularly to the said flat face, the said base plate, blocks and scriber respectively having face to face wringing or surface contact with each other, and a tie rod extending through the said holes in the plate, blocks and scriber and serving to connect them together with their respectively adjacent flat faces in contact as aforesaid.

21. A gauge comprising in combination a relatively large base plate provided with opposite parallel flat gaging faces at a predetermined precise distance apart and also provided with an abutment near one edge thereof located between the confines of the said opposite faces, one or more gauge blocks smaller than the base plate and each provided with similar opposite parallel flat faces at a predetermined precise distance apart and each also provided with an abutment located between the confines of the said opposite faces, a scriber having a flat face and having a scribing point in the plane of the said flat face, the said scriber also having an abutment, the said base plate, blocks and scriber respectively having face to face wringing or surface contact with each other, and connecting means engaging the abutments of the plate, and scriber and serving to connect the plate, blocks and scriber together with their respectively adjacent flat faces in contact as aforesaid and positioned to leave unobstructed the bottom gaging face of the base plate.

22. A gauge comprising in combination a relatively large base plate provided with opposite parallel flat gaging faces at a predetermined precise distance apart and also provided with a through hole therein near one edge thereof extending from one face to the other and countersunk to provide an abutment between the said opposite faces, one or more gauge blocks smaller than the base plate and each provided with similar opposite parallel flat faces at a predetermined precise distance apart and each also provided with a through hole therein extending from one face to the other, a scriber having a flat face and having a scribing point in the plane of the said flat face, the said scriber also having a through hole therein extending perpendicularly to the said flat face and forming an abutment, the said base plate, blocks and scriber respectively having face to face wringing or surface contact with each other, and a tie rod extending through the holes in the plate, blocks and scriber and having heads engaging the abutments of the base plate and scriber and serving to connect them together with their respectively adjacent flat faces in contact as aforesaid and positioned to leave unobstructed the bottom gaging face of the base plate.

In testimony whereof, I hereto affix my signature.

WILLIAM E. HOKE.